(12) United States Patent
Lavoie et al.

(10) Patent No.: US 9,733,104 B2
(45) Date of Patent: Aug. 15, 2017

(54) UTILITY METER EMULATION MODE SYSTEM AND METHOD

(71) Applicant: Aclara Meters LLC, Hazelwood, MO (US)

(72) Inventors: Gregory Paul Lavoie, Barrington, NH (US); Curtis Whitmore Crittenden, Dover, NH (US); Didier Gilbert Rouaud, Kennesaw, GA (US); Guy P. Lafond, Portsmouth, NH (US); Jason I. Subirana, Dover, NH (US)

(73) Assignee: Aclara Meters LLC, St. Louis, MO (US)

( * ) Notice: Subject to any disclaimer, the term of this patent is extended or adjusted under 35 U.S.C. 154(b) by 306 days.

(21) Appl. No.: 14/139,157

(22) Filed: Dec. 23, 2013

(65) Prior Publication Data

US 2015/0177021 A1    Jun. 25, 2015

(51) Int. Cl.
*G08B 23/00* (2006.01)
*G01D 4/00* (2006.01)

(52) U.S. Cl.
CPC ............ *G01D 4/002* (2013.01); *Y02B 90/241* (2013.01); *Y04S 20/32* (2013.01)

(58) Field of Classification Search
CPC .................................................... G01D 4/002
USPC ....................................... 340/870.01, 870.02
See application file for complete search history.

(56) References Cited

U.S. PATENT DOCUMENTS

| | | | |
|---|---|---|---|
| 5,808,558 A * | 9/1998 | Meek | G01D 4/002 340/10.1 |
| 6,081,204 A | 6/2000 | Lavoie et al. | |
| 6,181,257 B1 | 1/2001 | Meek et al. | |
| 6,393,341 B1 | 5/2002 | Lawrence et al. | |
| 6,486,652 B1 | 11/2002 | Ouellette et al. | |
| 6,564,159 B1 | 5/2003 | Lavoie et al. | |
| 6,611,772 B1 | 8/2003 | Lavoie et al. | |
| 6,823,273 B2 | 11/2004 | Ouellette et al. | |
| 7,065,457 B1 | 6/2006 | Germer et al. | |
| 2001/0038343 A1* | 11/2001 | Meyer | G01D 4/004 340/870.02 |

(Continued)

OTHER PUBLICATIONS

PCT Search Report and Written Opinion issued in connection with corresponding Application No. PCT/US2014/069302 on Feb. 19, 2015.

*Primary Examiner* — Amine Benlagsir
(74) *Attorney, Agent, or Firm* — Polster, Lieder, Woodruff & Lucchesi, L.C.

(57) ABSTRACT

One embodiment describes a utility metering system that includes metering infrastructure that facilitates data communication within the utility metering system in accordance with an expected metering platform, and a utility meter communicatively coupled to the metering infrastructure. The utility meter operates in a native mode when a native metering platform is compatible with the expected metering platform, in which the utility meter operates in a first manner in accordance with the native metering platform. The utility meter operates in an emulation mode when the native metering platform is not compatible with the expected metering platform and an emulation metering platform is compatible with the expected metering platform, in which the utility meter operates in a second manner in accordance with the emulation metering.

24 Claims, 3 Drawing Sheets

(56) References Cited

U.S. PATENT DOCUMENTS

2010/0073192 A1 3/2010 Goldfisher et al.

* cited by examiner

40 ↘

| FIELD NAME | VALUE |
|---|---|
| NBR_DEMAND_RESETS | 251 |
| TOT_DATA_BLOCK | |
| SUMMATIONS [0] | 1.02201984E4 |
| DEMANDS [0] | |
| EVENT_TIME | WED OCT 9 12:34:00 CDT 2013 |
| DEMAND | 2.5408E1 |

| FIELD NAME | VALUE |
|---|---|
| NBR_DEMAND_RESETS | 251 |
| TOT_DATA_BLOCK | |
| SUMMATIONS [0] | 1419472 |
| SUMMATIONS [1] | 0 |
| SUMMATIONS [2] | 0 |
| DEMANDS [0] | |
| EVENT_TIME | WED OCT 9 12:34:00 CDT 2013 |
| DEMAND | 3529 |
| DEMANDS [1] | |
| EVENT_TIME | TUE OCT 8 01:34:00 CDT 2013 |
| DEMAND | 1727 |

FIG. 3B

UTILITY METER EMULATION MODE SYSTEM AND METHOD

BACKGROUND

The subject matter disclosed herein relates to metering systems and more specifically, to metering platforms utilized in utility meters.

Generally, a utility meter may monitor consumption of a utility service, such as electrical power, natural gas, or water. More specifically, a utility meter may interface with meter programs, advanced metering infrastructure (AMI), billing systems, and the like. For example, the utility meter may transmit billing data, such as energy usage data, to a utility provider's billing system to bill the consumer according to various communication protocols, such as American National Standards Institute (ANSI) C12.18. Additionally, the billing data may be communicated in data tables, such as those defined by American National Standards Institute (ANSI) C12.19. However, as new metering platforms are developed, the new metering platforms may be incompatible with the meter programs, AMIs, and/or billing systems designed to interface with previous metering platforms. For example, because new metering platforms may aim to improve on previous platforms, the data collected, the communication protocols, and/or the user interfaces may differ from previous platforms. Similarly, meter programs, AMIs, and/or billing systems designed to interface with metering platforms designed by varying manufactures may also be incompatible.

Accordingly, it would be beneficial to enable a utility meter to interface with meter programs, AMIs, billing systems, and the like designed for other metering platforms. For example, this may include enabling the utility meter to emulate the functionality and/or interface of a different metering platform.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment describes a utility metering system that includes metering infrastructure that facilitates data communication within the utility metering system in accordance with an expected metering platform, and a utility meter communicatively coupled to the metering infrastructure. The utility meter operates in a native mode when a native metering platform is compatible with the expected metering platform, in which the utility meter operates in a first manner in accordance with the native metering platform. The utility meter operates in an emulation mode when the native metering platform is not compatible with the expected metering platform and an emulation metering platform is compatible with the expected metering platform, in which the utility meter operates in a second manner in accordance with the emulation metering.

A second embodiment describes a utility meter that includes memory that stores a native metering platform related to operation of the utility meter in a first manner, and one or more emulation metering platforms related to operation of the utility meter in a second manner. The utility meter also includes a processor that selectively switches between implementing the native metering platform and implementing one or more of the one or more emulation metering platforms stored in the memory. The utility meter emulates functionality, interface, or both of a non-native metering platform when the processor implements an emulation metering platform that corresponds to the non-native metering platform.

A third embodiment describes a non-transitory tangible computer-readable medium storing a plurality of instructions executable by a processor of a utility meter to determine an expected metering platform of metering infrastructure coupled to the utility meter, in which the metering infrastructure facilitates data communication with the utility meter in accordance with the expected metering platform, determine whether a native metering platform implemented in the utility meter is compatible with the expected metering platform, enter an emulation mode when the native metering platform is not compatible with the expected metering platform, in which the native metering platform relates to operation of the utility meter in a first manner, and implement one or more emulation metering platforms to emulate functionality, interface, or both of the expected metering platform when the utility meter is in emulation mode, in which the one or more emulation metering platforms relates to operation of the utility meter in a second manner.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3A is an example of a native data table of the utility meter of FIG. 2, in accordance with an embodiment;

FIG. 3B is an example of an emulated data table of the utility meter of FIG. 2, in accordance with an embodiment;

DETAILED DESCRIPTION OF THE INVENTION

Figure 1:
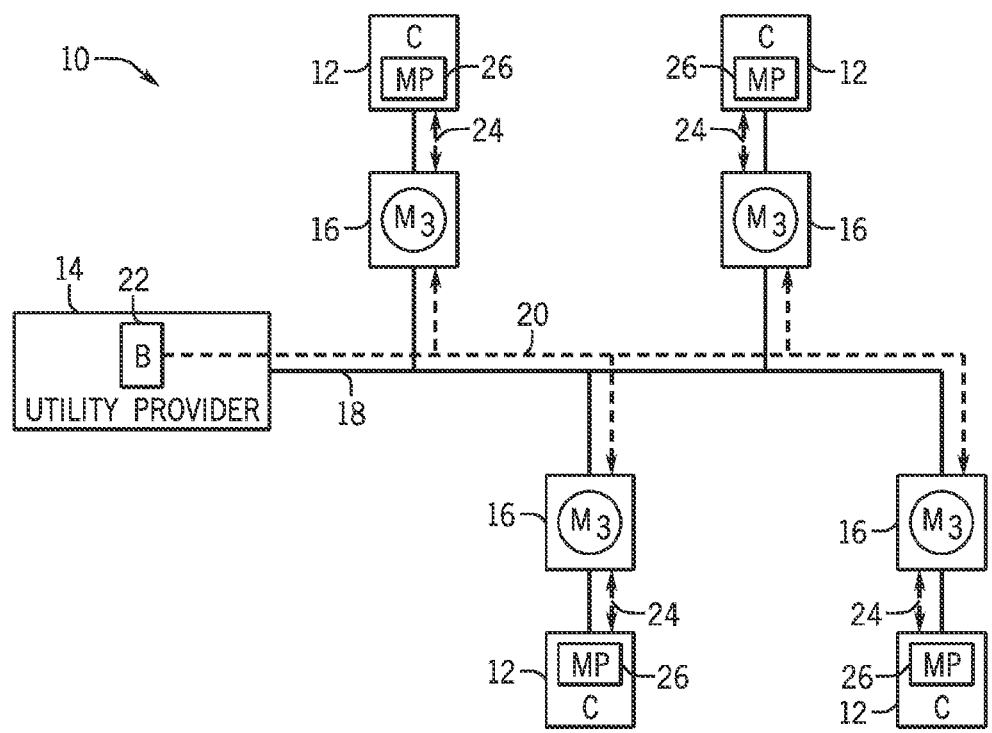
FIG. 1 is a schematic diagram illustrating a utility distribution and metering system including utility meters, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed above, a utility meter may monitor utility consumption by interfacing with meter programs, advanced metering infrastructure (AMI), service provider billing systems, and the like. As used herein, meter programs, advanced metering infrastructure (AMI), service provider billing systems, and the like may generally be referred to as "metering infrastructure." However, because some metering infrastructure is designed to interface with a specific metering platform, such metering infrastructure may be incompatible with newer metering platforms and/or metering platforms designed by other manufactures. These incompatibilities may result from differing data collected/stored, the communication protocols utilized, and/or the user interfaces. These incompatibilities may delay consumer and/or utility provider adoption of newer or different metering platforms.

Accordingly, one embodiment of the present disclosure describes a utility metering system that includes metering infrastructure that interfaces with an expected metering platform, in which the metering infrastructure is compatible with the expected metering platform, and a utility meter communicatively coupled to the metering infrastructure. The utility meter includes a native mode, in which the utility meter is in the native mode and implements a native metering platform when the native metering platform is compatible with the expected metering platform. The native metering platform is a metering platform native to the utility meter. The utility meter further includes an emulation mode, in which the utility meter is in the emulation mode and implements an emulation metering platform when the emulation metering platform is compatible with the expected metering platform. The emulation metering platform is a metering platform non-native to the utility meter. In other words, utility meters may interface with various metering infrastructures by utilizing an emulation mode. As used herein, "emulation mode" is intended to describe a mode that allows a utility meter to emulate (e.g., perform in a manner similar to) other metering platforms (e.g., a non-native metering platform). In some embodiments, the emulation mode may enable the utility meter to emulate the functionality and/or interface of another metering platform. For example, the utility meter may communicate emulated data tables that are substantially the same as data tables generated by the metering platform being emulated (e.g., emulated metering platform).

By way of introduction, FIG. 1 describes a utility distribution and metering system 10. More specifically, the utility distribution and metering system 10 distributes a utility services to various consumers 12 from a utility provider 14 and monitors (e.g., measures) the consumption by the consumers 12 via utility meters 16. As depicted, the utility provider 14 distributes utilities to the various consumers 12 through a distribution network 18. For example, when the utility provider 14 is providing electrical power, the distribution network 18 may be an electrical grid. Accordingly, the utility provider 14 may include power generation stations (e.g., using gas, coal, biomass, and other carbonaceous products for fuel), alternative power generation stations (e.g., using solar power, wind power, hydroelectric power, geothermal power, and other alternative sources of power), water processing plants, gas processing plants, and the like. To simplify the following discussion, the utility provided will be described as electrical power; however, in other embodiments, other utilities such as water or natural gas may also be distributed.

Additionally, as described above, the utility meters 16 monitor the consumption of the various consumers 12, which may include commercial and/or residential consumers. As depicted, each consumer's usage may be monitored by a separate utility meter 16. In some embodiments, the utility meters 16 may be single-phase or poly-phase electric meters. Additionally or alternatively, the utility meters 16 may be a smart meter such as an I-210 ANSI Meter or a kV2c ANSI Meter, made available by General Electric Company of Schenectady, N.Y. Each utility meter 16 may gather data that characterizes the consumer's consumption such as energy usage, maximum energy demand, minimums energy demand, demand interval length, time of use (TOU) calendars, status information, and the like. The gathered data may then be communicated to the utility provider 14 via a first communication network 20.

For example, a utility meter 16 may communicate the gathered data (e.g., utility usage data) to the utility provider's billing system 22. In some embodiments, the energy usage data may include total active energy usage (e.g., kWh) and maximum energy demand (e.g., kW) to enable the utility provider 14 to bill the consumer 12. Accordingly, the billing system 22 may be included in one or more computing devices, such as a workstation, mobile device, or desktop computer. Additionally, the first communication network 20 may be wired, wireless, or both. For example, a utility meter 16 may wirelessly communicate with a handheld meter reader or communicate via a smart grid. In some embodiments, the first communication network 20 may include advanced metering infrastructure (AMI) to enable two-way communication between the utility provider 14 and the utility meters 16. For example, this may enable the utility provider 14 to schedule disconnection or connection of utility services, automatic meter reading (AMR), load shedding/control, smart grid applications, outage reporting, and the like.

Furthermore, the gathered data may also be communicated back to the consumer 12 via a second communication network 24, which enables the consumer 12 analyze his/her utility usage. In some embodiments, the data may include utility usage data, load profile data, time of use (TOU) data, or any combination thereof. More specifically, some consumers 12 may utilize a meter program 26 to view meter diagnostics, display time of use (TOU) schedules/calendars, view alerts, record usage, and the like. Accordingly, in some embodiments, the meter program 24 may be included in a computing device, such as desktop computer, laptop computer, or mobile device.

Figure 2:
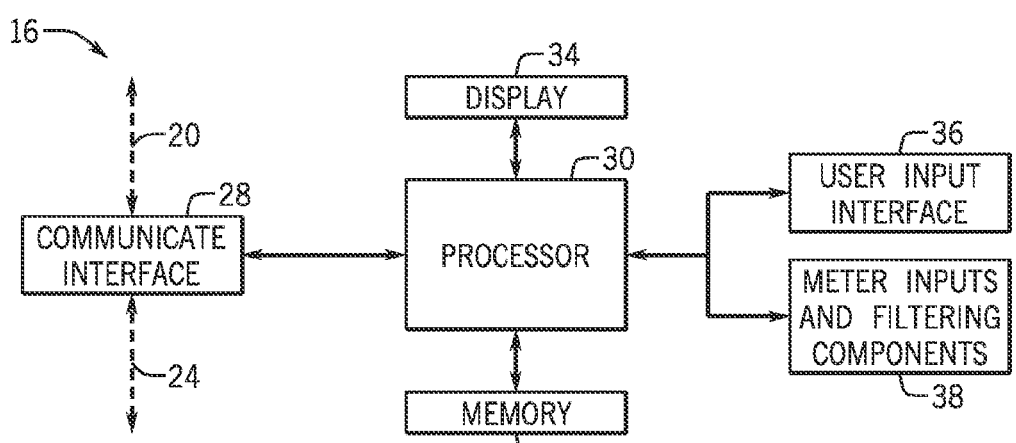
FIG. 2 is a block diagram illustrating components of a utility meter of FIG. 1, in accordance with an embodiment.

To facilitate the above described features, the utility meters 16 may include various components, such as a communication interface 28, one or more processor 30, memory 32, a display 34, a user input interface 36, and meter inputs/filtering components 38, as depicted in FIG. 2. More specifically, the various data, such as utility usage data, may be collected by the utility meter 16 via the meter inputs and filter components 38 from various sensors, such as current or voltage sensors. Accordingly, in some embodiments, the meter inputs and filter components 38 may include voltage and current inputs, one or more ADCs, and frequency filtering components.

As depicted, the meter inputs and filter components 38 are operatively coupled to the processor 30 to communicate the collected data to the processor 30. More specifically, the processor 30 may perform various monitoring and/or control functions. For example, the processor 30 may time align meter measurements received from the meter inputs and filtering components 38. To facilitate these various functions, the processor 30 is also be communicatively coupled to memory 32, which may include volatile and/or non-volatile memory that stores content, data, instructions or the like. For example, the memory 32 may be a tangible non-transitory medium that may store data transmitted to/from the utility meter 16 as well as software applications, instructions, or the like that enable the processor 30 to perform steps associated with operation of the utility meter 16. More specifically, as will be described in more detail below, the memory 32 may store, and the processor 30 may run, either or both of a native mode and an emulation mode. As used herein, "native mode" is intended to describe a mode that allows a utility meter to utilize its own (e.g., native) metering platform, while "emulation mode" is intended to describe a mode that allows a utility meter to emulate other metering platforms (e.g., a non-native metering platform).

Additionally, the display 34 and the user input interface 36 enable a user (e.g., the consumer 12 or the service provider 14) to interact directly with the utility meter 16. For example, the display 34 may communicate information to the user by displaying information such as energy usage, instantaneous power usage, error messages, meter status, and the like. Accordingly, the display 34 may be a light-emitting diode (LED) display, a liquid crystal display (LCD), or the like. The user input interface 36 may receive user inputs. For example, the user input interface 36 may enable the user to configure the meter 16, select different information to display, and the like. Accordingly, the user input interface 36 may includes a keypad, a joystick, a touch-screen display, a data input device (e.g., CD-Drive or USB port), or the like.

Furthermore, the utility meter 16 may interface with the first communication network 20, the second communication network 24, or both via the communication interface 28. In other words, the communication interface 28 enables the utility meter 16 to communicate with the utility provider 14 (e.g., billing system 22) and/or the consumer 12 (e.g., meter systems 26). In some embodiments, the data communicated to and from the utility meter 16 may be communicated in data tables, for example as defined by ANSI C12.19 or IEC 61968. Additionally, the communication interface 28 may enable the utility meter 16 to communicate in accordance with various communication protocols, such American National Standards Institute (ANSI) C12.18, ANSI C12.21, ANSI C12.22, International Electrotechnical Commission (IEC) 61107, IEC 62056, or any combination thereof.

However, as described above, various metering platforms may differ in the data collected/stored, communication protocols, and/or user interfaces. More specifically, the metering platforms may collect different measurements. For example, a first metering platform may simply collect the total active energy usage (e.g., kWh), whereas a second metering platform, in addition to collecting total active energy usage, may collect total reactive energy usage (e.g., kVArh) and total apparent energy usage (kVAh). The storage of the collected data may also differ. For example, the first metering platform may store collected data in engineering units (e.g., kWh), whereas the second metering platform may store collected data as raw values. Additionally, the metering platforms may utilize differing communication protocols. For example, the first metering platform may utilize the ANSI C12.18 communication protocol, whereas the second metering platform may utilize IEC 62056. Furthermore, the metering platforms may interact with a user differently. For example, the first metering platform may simply display energy usage (e.g., kWh), whereas the second metering platform may display a cumulative demand (e.g., kW) in addition to energy usage.

As described above, the differences between various metering platforms may cause some metering platforms to be incompatible with metering infrastructure (e.g., billing systems 22) designed for other metering platforms. Additionally, users (e.g., consumers 12 and/or utility provider 14) may be unfamiliar with differences in the user interface (e.g., display 34 and/or user input interface 36). As can be appreciated, this may delay the approval and adoption of new metering platforms. Accordingly, as described above, a utility meter 16 may employ an emulation mode. As will be described in more detail below, the emulation mode does not merely enable backwards compatibility. Instead, the emulation mode enables the utility meter 16 to mimic (e.g., emulate) the functionality and/or interface of a different metering platform. In some embodiments, to metering infrastructure, a utility meter 16 in emulation mode appears identical to the metering platform being emulated (e.g., emulated metering platform. In other words, the utility meter 16 may collect the same data, store the data in the same format, communicate using the same communication protocol, interact with a user in the same manner, or any combination thereof even when it includes a native metering platform different than the one being emulated.

To help illustrate the functionality of the emulation mode, FIG. 3A depicts a native data table 40 and FIG. 3B depicts an emulation data table 42. As used herein, "native data table" is intended to describe a data table generated when the utility meter 16 is in native mode, and "emulation data table" is intended to describe a data table generated when the utility meter 16 is in emulation mode. More specifically, FIGS. 3A and 3B depict embodiments of Current Register Data Tables (e.g., Table 23), in accordance with ANSI C12.19. As depicted, both the native data table 40 and the emulation data table 42 include the number of demand resets (i.e., NBR_DEMAND_RESETS 44). For example, in the depicted embodiments, the NBR_DEMAND_RESETS 44 is 251. In some embodiments, this may indicate the number of demands requested because the demand is reset after each request.

Additionally, the data tables 40 and 42 include the data to be communicated in data blocks (e.g., TOT_DATA_BLOCK 46 and TOT_DATA_BLOCK 48). As depicted, the emulation TOT_DATA_BLOCK 48 includes more data field as compared to the native TOT_DATA_BLOCK 46. More specifically, the native TOT_DATA_BLOCK 46 includes a first summation (i.e., SUMMATIONS [0] 50) and a first demand (e.g., DEMANDS [0] 52) while the emulation TOT_DATA_BLOCK 48 additionally includes a second summation (e.g., SUMMATIONS [1] 52), a third summation (e.g., SUMMATIONS [2] 54), and a second demand (e.g., DEMANDS [1] 56). It should be noted that the data tables 40 and 42 are merely illustrative of the techniques described herein. In other words, even though the native data table 40 may include fewer data fields, operating in native mode may provide more functionality than operating in emulation mode with an emulation metering platform (e.g., prior generation).

The differences between the data blocks 40 and 42 may result from differences between the native metering platform and the emulated metering platform. For example, as in the depicted embodiment, the emulated metering platform may be designed to collect and/or communicate more pieces of data. Illustratively, the native metering platform may collect and/or communicate the total active energy usage (e.g., SUMMATIONS [0] 50), the maximum demand (e.g., DEMAND 58), and a time associated with the maximum demand (e.g., EVENT_TIME 60). On the other hand, the emulated metering platform may collect and/or communicate the total active energy usage (e.g., SUMMATIONS [0] 50), the total reactive energy usage (e.g., SUMMATIONS [1] 62), the total apparent energy usage (e.g., SUMMATIONS [2] 64), the maximum demand (DEMAND 58), a time associated with the maximum demand (e.g., EVENT_TIME 60), the minimum demand (e.g., DEMAND 66), and a time associated with the minimum demand (e.g., EVENT_TIME 68). It should be noted that data collected by the utility meter 16 is merely illustrative. For example, some utility meters may not collect the minimum demand.

As described above, to compensate for the differences between various metering platforms, the utility meter 16 may enter an emulation mode. For example, when in emulation mode, the utility meter 16 may generate the emulated data table 42 to interface with metering infrastructure designed to interface with the emulated metering platform. In some embodiments, the emulated data table 42 is identical to a data table generated by the emulated metering platform. As depicted, similar fields (e.g., SUMMATIONS [0] 50 and DEMANDS [0] 52) may be populated with data representative of the same information. However, the data may be represented differently because standards governing the data tables (e.g., ANSI C12.19) often provides for flexibility in quantity types, formats, or number of quantities to name a few. However, utility meters 16 sometimes may only implement a specific subset of the standards supported by the utility meter 16. For example, in the depicted embodiment, the total active energy usage (e.g., SUMMATIONS [0] 50) is represented in floating point engineering units (e.g., 1.02201984 e4) in the native data table 40 and in fixed point raw values (e.g., 1419472) in the emulated data table 42. More specifically, the raw values may be converted to engineering units by multiplying a register multiplier and dividing a register divisor. For example, in the depicted embodiment, the raw value (e.g., 1419472) is multiplied with the register multiplier (e.g., 72) and divided by the register divisor (e.g., 10,000) to result in 10220.1984 kWh. Accordingly, to populate the emulated data table 42, the utility meter memory 32 may store the collected data in both the native format (e.g., engineering units) and emulated format (e.g., raw values or primary units), or one format (e.g., native or emulated) and various multiplies/divisors to enable conversion to a different format. The DEMANDS [0] 52 may be populated similarly.

On the other hand, different fields (e.g., SUMMATIONS [1] 62, SUMMATIONS [2] 64, and DEMANDS [1] 56) may be populated based on the data collected/stored in the utility meter memory 32. For example, in the depicted embodiment, because the utility meter 16 may not collect/store the total reactive energy usage and the total apparent energy usage, SUMMATIONS [1] 62 and SUMMATIONS [2] 64 are populated with zeroes. Additionally, even though not included in the native data table 40, the utility meter may collect/store a minimum demand and event time value in the utility meter memory 32, and populate DEMANDS [1] accordingly. In some embodiments, the utility meter 16 may always collect the minimum demand and event time, whereas in other embodiments, the utility meter 16 may only collect the minimum demand and event time while in emulation mode. In other words, the utility meter 16 may collect data (e.g., minimum demand and event time) even though it will not be included within the native data table 40. Thus, although the emulated data table 42 may be generally compatible with metering infrastructure designed for the emulated metering platform, additional design considerations regarding the data collected/stored in the utility meter may be made, such as the types of data (e.g., various fields of data) and the format of the data (e.g., engineering units or raw values). In some embodiments, the type of data collect and the storage format of the data may be based on the metering infrastructure receiving the emulation data table 42. For example, based on the described example, a billing system 22 may require the minimum demand (e.g., DEMANDS [1] 56) but not require the total reactive energy usage (e.g., SUMMATIONS [1] 62 and SUMMATIONS [2] 64). Accordingly, the processor 30 may instruct the meter inputs 38 and the sensors associated with the inputs to collect/store data based on the utility meter mode (e.g., native or emulation mode) and the requirements of emulated metering platforms.

Based on above description, the utility meter 16 may interface with metering infrastructure designed for the emulated metering platform by entering the emulation mode and generating emulation data tables 42. Comparatively, a backwards compatible metering platform may merely generate data tables compatible with an older metering platform. However, this may constrain what can be done with the utility meter 16 and/or make the interfacing with metering infrastructure suboptimal. For example, if a previous metering platform is unable to decrypt encoded data tables, the backwards compatible data tables should be unencrypted. Similarly, an emulation data table 42 generated in emulation mode may also be unencrypted. However, the ability to exit the emulation mode and enter the native mode enables the utility meter 16 to generate encrypted native data tables 40, which may improve the security of data (e.g., data included in native data table 40) output by the utility meter 16. Moreover, the emulation mode enables utility meter 16 to generate one, multiple, or all of the data tables in accordance with the emulated metering platform. In some embodiments, this may include data tables that define the interface and capabilities of the utility meter 16.

Additionally, for a metering platform to be backwards compatible, the metering platform may be specifically designed to be backwards compatible with specific previous metering platforms. In other words, the backwards compatibility of the metering platform may be limited by its design. For example, backwards compatibility may constrain operation to extensions of the previous generations (e.g., limiting significant changes). Comparatively, the present techniques enable emulation metering platforms to be designed for use in the utility meter's emulation mode. As used herein, "emulation metering platform" is intended to describe a metering platform designed to enable a utility meter 16 to emulate another metering platform (e.g., emulated metering platform). In other words, the emulation mode increases flexibility in compatibility because the utility meter 16 may emulate various metering platforms simply by utilizing a corresponding emulation metering platform. In some embodiments, emulation metering platforms may additionally be installed in the utility meter 16 after manufacture. For example, the utility meter 16 may download emulation metering platforms from the utility provider 14 and/or consumer 12 as needed via the communication networks 20 or 24. In some embodiments, the emulation metering platforms may emulate a previous version metering platform and/or a metering platform designed by a different manufacturer. In other words, the techniques described herein enable the utility meter 16 to selectively switch between one or more emulation metering platforms (e.g., emulation mode) and a native metering platform (e.g., native mode).

Figure 4:
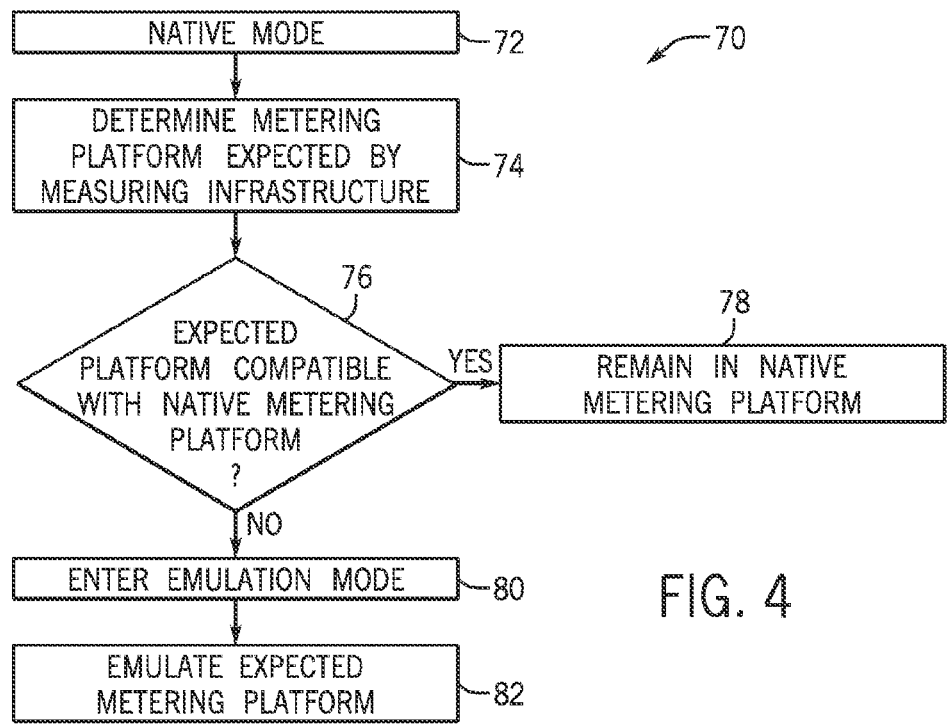
FIG. 4 is a flow chart describing entering an emulation mode, in accordance with an embodiment.

One embodiment of a process 70 for selectively switching between the native metering platform and one or more emulation metering platforms is described in FIG. 4. Generally, the process 70 may include starting in the native mode (process block 72), determining a metering platform expected by metering infrastructure (process block 74), determining whether the native metering platform is compatible with the expected metering platform (decision block 76), and if compatible, remaining in the native mode (process block 78). On the other hand, if incompatible, the utility meter enters emulation mode (process block 80) and emulates the expected metering platform (process block 82).

More specifically, the utility meter 16 may start in its native mode (process block 72) to enable the utility meter 16 (e.g., processor 30, memory 32, communication interface 28, display 34, user input interface 36, and/or meter inputs 38) to operate as designed. For example, the processor 30 may collect meter measurements via the meter inputs 38 and the memory 32 may store the measurements as designed. In some embodiments, the utility meter 16 may operate more efficiently when utilizing its native metering platform because the native metering platform is optimized for the particular utility meter 16. Additionally, because the various emulation metering platforms may be designed for use with the utility meter 16, operating in the native metering platform provides a baseline for switching to the various emulation metering platforms. In other embodiments, the utility meter 16 may remain in its most recent metering platform even if the most recent is an emulation metering platform to reduce the number of metering platform switches.

The utility meter 16 may then determine what metering platform the metering infrastructure is expecting (process block 74). In other words, what metering platform the metering infrastructure is compatible with. In some embodiments, this may include polling the metering infrastructure (e.g., billing system 22 or meter program 26). For example, the processor 30 may send a request to the billing system 22 via the communication networks 20 and 24 requesting an expected metering platform, and the billing system 22 may return a response (e.g., indication) specifying the expected metering platform. The expected metering platform may then be determined by the processor 30 and communicated to the memory 32 for storage. Additionally or alternatively, the metering infrastructure may push an indication of the expected metering platform to the utility meter. In other embodiments, a user (e.g., service provider 14 or consumer 12) may directly identify the expected metering platform to use in the utility meter 16, for example via the user input interface 36. Furthermore, in other embodiments, a manufacturer may set the expected metering platform when the utility meter 16 is manufactured.

Once the expected metering platform is determined, the utility meter 16 determines whether the native metering platform is compatible with the expected metering platform (decision block 76). For example, the processor 30 may compare the native metering platform and the expected metering platform stored in memory. In some embodiments, the processor 30 may determine that the native metering platform is compatible with the expected metering platform when they are the same. Additionally or alternatively, the processor 30 may determine that the metering platforms are compatible when the native metering platform is cross-compatible with the expected metering platform. In other words, in addition to utilizing the emulation mode, the native metering platform itself may also be designed to be cross-compatible with other metering platforms (e.g., backwards compatible). If the native metering platform is compatible with the expected metering platform, the utility meter 16 (e.g., processor 30, memory 32, communication interface 28, display 34, user input interface 36, and/or meter inputs 38) remains in the native mode (process block 78) and operates in accordance with the native metering platform.

On the other hand, if the native metering platform is not compatible with the expected metering platform, the utility meter 16 enters emulation mode to enable the utility meter to switch to an emulation metering platform (process block 80). In some embodiments, the processor 30 may retrieve the emulation metering platform from the memory 32. In other embodiments, the processor 30 may download the emulation metering platform via the communication interface 28, for example from the utility provider 14, or user input interface 36, for example from flash drive, and store the emulation metering platform in the memory 32.

The utility meter may then emulate the expected metering platform by implementing the emulation metering platform (process block 82). In some embodiments, the processor 30 may instruct the rest of the utility meter (e.g., memory 32, communication interface 28, display 34, user input interface 36, and/or meter inputs 38) to operate in accordance with the emulation metering platform. As described above, utilizing the emulation metering platform may enable the utility meter 16 to be functionally identical to the expected metering platform. For example, the processor 30 and/or the communication interface 28 may generate an emulated data table 42 to communicate data with metering infrastructure compatible with the metering platform being emulated. Accordingly, users (e.g., service providers 14 and consumers 12) may implement the utility meter 16 with their existing metering infrastructure, which may improve the adoption of the utility meter 16.

Figure 5A:
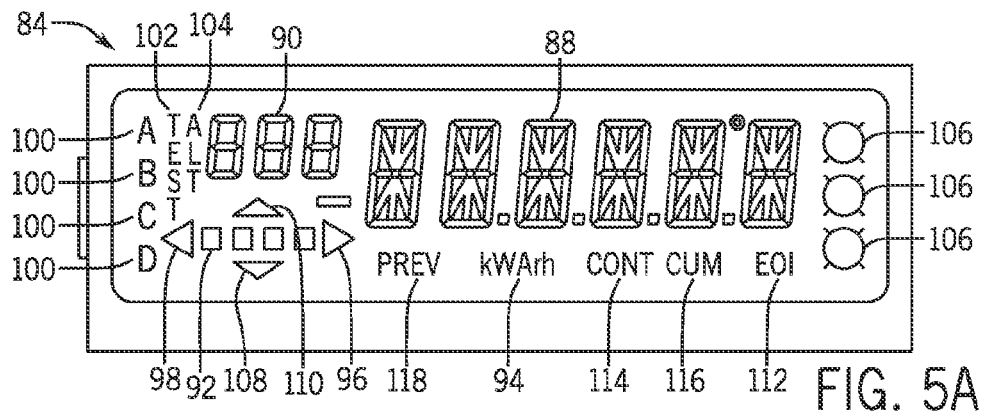
FIG. 5A is a native user interface of the utility meter of FIG. 2, in accordance with an embodiment.
Figure 5B:
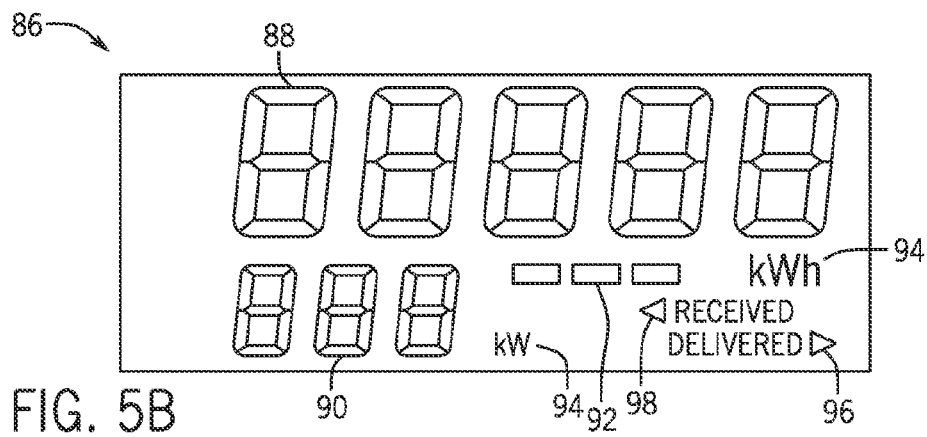
FIG. 5B is an emulated user interface of the utility meter of FIG. 2, in accordance with an embodiment.

Utilizing a process similar to process 70 described in FIG. 4, the utility meter 16 may additionally utilize the emulation metering platform to emulate the interface (e.g., display 34) of the expected metering platform. Illustratively, a native display 84 is depicted in FIG. 5A and an emulated display 86 is depicted in FIG. 5B. As used herein, "native display" is intended to describe a display displayed when the utility meter 16 is in native mode, and "emulated display" is intended to describe a display displayed when the utility meter 16 is in emulation mode. As depicted, the displays 84 and 86 include similar elements in differing configurations.

More specifically, both displays 84 and 86 include alphanumeric characters 88, alphanumeric characters 90, energy cycle indicators 92, display units 94, energy delivered indicators 96, and energy received indicators 98. In some embodiments, the alphanumeric characters 88 may display energy usage values, instantaneous power usage, and the like; the alphanumeric characters 90 may display a display label or a status code (e.g., caution or error); the energy cycle indicators 92 may indicate the percentage completion of an energy cycle; the display units 94 may indicate the measurement units for the alphanumeric characters 90; the energy deliver indicators 96 may indicate that energy is being delivered to the load; and the energy received indicator 98 may indicate that energy is being received from the load.

Additionally, the native display 84 includes other elements not included on the emulated display 86. For example, the native display 84 includes time of use (TOU) indicators 100 that may indicate what time of use rate is in effect; a test mode indicator 102 that may indicate when the utility meter 16 is in a test mode; an alternate display indicator 104 that may indicate when the display 34 is in an alternate display mode; voltage phase indicators 106 that may indicate what voltage phase (e.g., A, B, C) is present; a leading indicator 108 that may indicate total reactive energy usage (e.g., kVArh) is leading; a lagging indicator 110 that may indicate total reactive energy usage (e.g., kVArh) is lagging; an end of interval (EOI) indicator 112 that may indicate an EOI condition; a continuous indicator 114 that may indicate when the display 34 is displaying continuous demand measurements; a cumulative indicator 116 that may indicate when the display 34 is displaying continuous demand measurements; and a previous interval indicator 118 that may indicate when the display 34 is displaying data from a previous season or billing cycle.

As can be appreciated, these additional elements may be unfamiliar to users (e.g., consumer 12 or utility provider 14). Accordingly, to improve adoption, the utility meter 16 may utilize an emulated display 86 generally identical to a metering platform familiar to the user. Additionally or alternatively, the emulated display 86 may be a simplified version of the native display 84. For example, the simplified display may display only elements (e.g., alphanumeric characters 88, alphanumeric characters 90, energy cycle indicators 92, display units 94, energy delivered indicators 96, and energy received indicators 98) that are generally desired by the user, which, as described above, may include energy usage values, instantaneous power usage, a display label or a status code, percentage completion of an energy cycle, measurement units for the display, and whether energy is being delivered to or received from the load.

In other embodiments, other aspects of the utility meter 16, such as the communication protocol and user input interface 36, may also emulate other metering platforms. For example, the user input interface 36 may emulate the input configuration utilized in another metering platform. In some embodiments, this may include configuring buttons in the user input interface 36 to perform similarly to corresponding buttons used in the emulated metering platform. Additionally, in some embodiments, if the user input interface 36 is a touch screen display, the user input interface 36 may display a user input interface 36 corresponding with buttons, labels, configurations, and the like utilized in the emulated metering platform. Furthermore, if the native metering platform utilizes ANSI C12.18 and an emulated metering platform utilizes IEC 62056-2, the utility meter 16 may enter emulation mode and instruct the communication interface 28 to communicate according to IEC 62056-2.

In some embodiments, different aspects of the utility meter (e.g., display 34 or user input interface 36) may operate in accordance with different metering platforms. For example, the utility meter 16 may utilize an emulated display 84 while communicating data in native data tables 40. Additionally, the utility meter 16 may utilize an emulated communication protocol (e.g., IEC 62056-2) to communicate with the billing system 22 while utilizing the native communication protocol (e.g., ANSI C12.18) to communicate with the meter program 26. Accordingly, the flexibility of the utility meter 16 may be further increased because different aspects of the meter may be configured according to various metering platforms. In other words, each aspect of the utility meter 16 may be separately configured to operate in accordance with the native metering platform or an emulation metering platform.

Technical effects of the present disclosure include improving the compatibility of a utility meter 16 with various metering platforms. More specifically, the utility meter 16 may enter an emulation mode to emulate the functionality and/or interface of a different metering platform. In some embodiments, this may include utilizing an emulated data table 42, an emulated display 86, an emulated communication protocol, an emulated user input interface, and the like. Accordingly, this may improve compatibility with existing metering infrastructure and user familiarity. Additionally, the present disclosure enables the utility meter 16 to selectively enter/exit emulation mode, which may place less constraints on the design of the utility meter 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A utility metering system for coupling to a metered component at a metered location for collecting utility data from the metered component related to a provided utility service and for coupling to a metering infrastructure monitoring, collecting and transferring utility information within the utility metering system from a plurality of coupled utility metering systems in accordance with an expected metering functionality platform, the utility metering system comprising:

a utility meter having a processor, a memory, computer executable instructions, a first communication interface for communicatively coupling over a communication network to the metering infrastructure, a second communication interface for communicatively coupling to the metered component, and a user interface for displaying user data and receiving user instructions, wherein the computer executable instructions are configured to configure the utility meter to:

receive over the second communication interface the metered component of the utility data from the coupled metered component;

store the received metered component of the utility data in the memory;

store a native metering functionality platform for communicating over the first communication interface with the metering infrastructure;

identify the expected metering functionality platform;

compare the identified expected metering functionality platform with the stored native metering functionality platform;

operate the first communication interface and the communicatively coupling with the metering infrastructure in a native mode when the native metering functionality platform is compared to be the same as or compatible with the expected metering functionality platform, wherein the utility meter is configured to operate in a first operational manner in accordance with the native metering functionality platform, the first operational manner having first operational functions including a first protocol of the first communication interface, a first meter operating program, a first type of the utility data received and stored, a first operation of the user interface of the utility meter including the first type of the utility data displayed on the user interface; and operate in an emulation mode when the native metering functionality platform is not the same or is not compatible with the expected metering functionality platform, wherein the utility meter is configured to operate in a second operational manner in accordance with an emulation metering functionality platform in conjunction with the emulation mode that is compatible with the expected metering functionality platform, the second operational manner includes having second operational functions including a second protocol of the first communication interface, a second first meter operating program, a second type of the utility data received and stored, a second operation of the user interface of the utility meter including the second type of the utility data displayed on the user interface, wherein two or more of the second operational functions of the second operational manner are different than the first operational functions of the first operational manner of the native metering functionality platform.

2. The utility metering system of claim 1, wherein the utility meter is configured to emulate functionality and the first communication interface, or both of the expected metering functionality platform when the utility meter operates in the emulation mode.

3. The utility metering system of claim 1, wherein the expected metering functionality platform of the metering infrastructure comprises a billing system, an advanced metering infrastructure, a meter program, or any combination thereof, and wherein the native mode and the native metering functionality platform configure the first operational manner of the utility meter to transfer utility information in compliance with the expected metering functionality platform.

4. The utility metering system of claim 1, wherein said identifying the expected metering functionality platform includes determining the expected metering functionality platform based on an indication sent from the metering infrastructure via the communication network.

5. The utility metering system of claim 1, wherein the utility meter is configured to communicate data to the metering infrastructure via native data tables when the utility meter operates in the native mode, and to communicate data to the metering infrastructure via emulated data tables when the utility meter is in the emulation mode.

6. The utility metering system of claim 1, wherein the utility meter is configured to emulate a display, and a user input interface of the expected metering protocol when the utility meter is in the emulation mode.

7. The utility metering system of claim 1, wherein the native metering functionality platform is stored in the utility meter as the expected metering functionality platform during manufacture of the utility meter.

8. The utility metering system of claim 1 wherein the second communication interface is configured for coupling to the metered component at the metered location and collecting metered utility data from the metered component related to the provided utility service selected from the group consisting of a sensor, a voltage collector, a current collector, a frequency collector, a filter, and an analog-to-digital converter (ADC).

9. The utility metering system of claim 1 wherein the utility meter receives, collects, and stores metered utility data from the metered component independent of the stored native metering functionality platform.

10. The utility metering system of claim 1 wherein the native metering functionality platform and the emulation metering functionality platform are further configured such that the second communication interface collect metered component data in compliance therewith, and the native metering functionality platform and the emulation metering functionality platform being different.

11. The utility metering system of claim 1 wherein the native metering functionality platform and the emulation metering functionality platform are further configured to enable a different user interface compatible therewith such that the displayed user data and received user instructions are compliant with the appropriate native and emulation metering functionality platforms.

12. The utility metering system of claim 1 wherein the identifying the expected metering functionality platform includes transmitting a request over the first communication interface and receiving a response specifying the expected metering functionality platform.

13. The utility metering system of claim 1 wherein the identifying the expected metering functionality platform includes receiving a user instruction via the user interface specifying the expected metering functionality platform.

14. The utility metering system of claim 1 wherein the utility meter further includes a third interface configured for communicating with a metered location system or program including one or more of collected utility data, utility information, meter diagnostics, display of time of use (TOU) schedules/calendar, viewing of alerts, and usage data.

15. The utility metering system of claim 1 wherein the utility meter further is configured for storing the emulation metering functionality platform that is compatible with the expected metering functionality platform, and wherein the identifying the expected metering functionality platform identifies the expected metering functionality platform to be compatible with the stored emulation metering functionality platform.

16. The utility metering system of claim 1 wherein the utility meter identified the expected metering functionality platform and the comparing of the identified the expected metering functionality indicates that the native metering functionality platform is different or not compatible with the expected metering functionality platform, and wherein the utility meter determines that it does not have a metering functionality platform that is stored in its memory that is compatible with the expected metering functionality platform, the utility meter initiates a download over at least one of the first and the second communication interfaces to receive, store and operate the emulation metering functionality platform that is compatible with the expected metering functionality platform.

17. A utility meter for installation at a metered location for collecting utility data from a metered component at said metered location, the utility meter being incorporated in a utility metering system coupled to metering infrastructure that monitors, collects, and transfers utility information within the utility metering system in accordance with an expected metering functionality platform, the utility meter comprising:

a processor, a memory, computer executable instructions, a first communication interface for communicatively coupling over a communication network to the metering infrastructure, a second communication interface for communicatively coupling to the metered component, and a user interface for displaying user data and receiving user instructions, wherein the computer executable instructions are configured to configure the utility meter to:

receive over the second communication interface the metered component of the utility data from the metered component;

store the received metered component of the utility data in the memory;

store a native metering functionality platform for communicating over the first communication interface with the metering infrastructure;

identify the expected metering functionality platform;

compare the identified expected metering functionality platform with the stored native metering functionality platform;

operate the first communication interface and the communicatively coupling with the metering infrastructure in a native mode when the native metering functionality platform is compared to be the same as or compatible with the expected metering functionality platform, wherein the utility meter is configured to operate in a first operational manner in accordance with the native metering functionality platform, the first operational manner having first operational functions including a first protocol of the first communication interface, a first meter operating program, a first type of the utility data received and stored, a first operation of the user interface of the utility meter including the first type of the utility data displayed on the user interface; and operate in an emulation mode when the native metering functionality platform is not the same or is not compatible with the expected metering functionality platform, wherein the utility meter is configured to operate in a second operational manner in accordance with an emulation metering functionality platform in conjunction with the emulation mode that is compatible with the expected metering functionality platform, the second operational manner includes having second operational functions including a second protocol of the first communication interface, a second meter operating program, a second type of the utility data received and stored, a second operation of the user interface of the utility meter including a second type of the utility data displayed on the user interface, wherein two or more of the second operational functions are different than the first operational functions of the first operational manner of the native metering functionality platform.

18. The utility meter of claim 17, wherein the processor is configured to receive a first emulation metering functionality platform via the first communication interface and to store the first emulation metering functionality platform in the memory.

19. The utility meter of claim 17, comprising meter inputs and filtering components, wherein the meter inputs and filtering components are configured to collect data collected in a first non-native metering functionality platform when the processor implements a first emulation metering functionality platform.

20. The utility meter of claim 19, comprising a display, wherein the display is configured to emulate a non-native display utilized in the first non-native metering functionality platform when the processor implements the first emulation metering functionality platform.

21. A non-transitory tangible computer-readable medium storing a plurality of instructions executable by a processor of a utility meter also including, a memory, computer executable instructions, wherein the computer executable instructions are configured to configure the utility meter to:

receive user instructions, wherein the utility meter also including a first communication interface for communicatively coupling to a metering infrastructure, a second communication interface for communicatively coupling to a metered component at a metered location, and a user interface for displaying user data;

determine via the processor an expected metering functionality platform of the metering infrastructure coupled to the utility meter, wherein the metering infrastructure facilitates information transfer with the utility meter in accordance with the determined expected metering functionality platform;

determine via the processor whether a stored native metering functionality platform implemented in the utility meter is compatible with the determined expected metering functionality platform, the native metering functionality platform relating to operation of the utility meter in a first operational manner with the native metering functionality platform communicating over the first communication interface with the metering infrastructure, the first operational manner having first operational functions including a first protocol of the first communication interface, a first meter operating program, a first type of the utility data received and stored, a first operation of the user interface of the utility meter including a first type of the utility data displayed on the user interface;

enter an emulation mode at the utility meter when the native metering functionality platform is not found to be not the same or is not compatible with the expected metering functionality platform after comparing the expected metering functionality platform with the stored native metering functionality platform; and implement one or more emulation metering functionality platforms at the utility meter to emulate functionality, interface, or both of the expected metering functionality platform when the utility meter is in the emulation mode, wherein the one or more emulation metering functionality platforms relates to the operation of the utility meter in a second operational manner, the second operational manner includes having second operational functions including a second protocol of the first communication interface, a second meter operating program, a second type of the utility data received and stored, a second operation of the user interface of the utility meter including the second type of the utility data displayed on the user interface, wherein two or more of the second operational functions of the second operational manner are different than the first operational functions of the first operational manner of the native metering functionality platform.

22. The medium of claim 21, wherein the computer executable instruction said to determine whether the native metering functionality platform implemented in the utility meter is compatible with the expected metering functionality platform further comprises first instructions to:

determine whether the native metering functionality platform is the same as the expected metering functionality platform; and determine whether the native metering functionality platform is cross-compatible with the expected metering functionality platform.

23. The medium of claim 21, further comprising instructions to emulate a communication protocol, a user input interface, a display or any combination thereof utilized in the expected metering functionality platform when the utility meter implements the one or more emulation metering functionality platforms.

24. The medium of claim 21, further comprising instructions to communicate data from the utility meter to the metering infrastructure via an emulated data table, wherein the emulated data table is substantially the same as a data table generated by the expected metering functionality platform.

* * * * *